United States Patent [19]
Imamura et al.

[11] Patent Number: 5,282,689
[45] Date of Patent: Feb. 1, 1994

[54] ROLLING BEARING

[75] Inventors: Yoichi Imamura, Kawasaki; Fusasuke Goto, Yokosuka; Norihiro Aoki, Tokyo, all of Japan

[73] Assignee: NSK Ltd., Tokyo, Japan

[21] Appl. No.: 875,405

[22] Filed: Apr. 29, 1992

Related U.S. Application Data

[63] Continuation of Ser. No. 827,036, Jan. 29, 1992.

[30] Foreign Application Priority Data

Sep. 20, 1991 [JP] Japan .................. 3-241179

[51] Int. Cl.$^5$ ............................... F16C 19/00
[52] U.S. Cl. ................................... 384/492
[58] Field of Search .......... 384/462, 492, 912, 913; 252/12

[56] References Cited

U.S. PATENT DOCUMENTS

| | | | |
|---|---|---|---|
| 4,481,123 | 11/1984 | Hentschel et al. | 252/52 R |
| 4,696,581 | 9/1987 | Tsushima et al. | 384/492 X |
| 4,992,111 | 2/1991 | Yamada et al. | 384/492 X |

FOREIGN PATENT DOCUMENTS

| | | |
|---|---|---|
| 194047 | 10/1985 | Japan . |
| 1-259097 | 10/1989 | Japan . |
| 3-210394 | 9/1991 | Japan . |
| 3-250094 | 11/1991 | Japan . |
| 601604 | 5/1948 | United Kingdom . |
| 615188 | 1/1949 | United Kingdom . |
| 642255 | 8/1950 | United Kingdom . |
| 773118 | 4/1957 | United Kingdom . |

OTHER PUBLICATIONS

"SKF MR Produced Rolling Bearing Steels", *SKF Ball Bearing Journal*, 231(1), 1987 Akesson et al. pp. 12–19.
"Bearing Steel Development", *SKF Ball Bearing Journal Special '89*, Kroon et al., pp. 40–47.
Tsushima et al., "Rolling Contact Fatigue Life of Various Kinds of High-Hardness Steels and Influence of Material Factors on Rolling Contact Fatigue Life", 1988.
"Kikai No Kenkyo", (Study on Machines) 40(10), 1988.
"New Shell Alvania Greases", 1982 (exerpt English translation attached).
Shell Product Information, 1983.

*Primary Examiner*—Thomas R. Hannon
*Attorney, Agent, or Firm*—Wegner, Cantor, Mueller & Player

[57] ABSTRACT

A rolling bearing is composed of an outer race, an inner race and rolling elements interposed between the outer race and the inner race. A lubricant composition comprising a polyether lubricant as a base oil is filled in the bearing. Preferably, the polyether lubricant has a kinematic viscosity 90–160 cSt at 40° C.

1 Claim, 4 Drawing Sheets

ROLLING BEARING

CROSS-REFERENCE TO RELATED APPLICATION

This application is a continuation of Ser. No. 07/827,036, filed Jan. 29, 1992.

BACKGROUND OF THE INVENTION

1) Field of the Invention

This invention relates to a rolling bearing, and especially to a rolling bearing effectively usable under such usage conditions that a housing with the rolling bearing held thereon is elastically deformed by external force and off-load is applied to the bearing due to the resulting deformation or in such a field that the bearing is used at high temperature and high speed and under heavy load.

2) Description of the Related Art

In the case of a rolling bearing employed, for example, in an alternator of an automobile, its outer race is prone to damage, primarily flaking and the like because its aluminum-made housing undergoes elastic deformation due to external force and off-load is hence applied. In the case of a rolling bearing employed in an electromagnetic clutch, on the other hand, a shaft is made of aluminum so that its inner race to which off-load is exerted due to elastic deformation of the shaft is more susceptible to damage.

Employed as such conventional rolling bearings for automobiles are ball bearings each of which uses, for both outer and inner races, a bearing steel such as high-carbon chromium bearing steel having an oxygen content of 9 ppm or so. Standard heat treatment (so-called "whole quench hardening") has been applied to the race more susceptible to damage (i.e., the outer race in the case of an alternator or the inner race in the case of an electromagnetic clutch) to impart rolling contact fatigue strength thereto, and a grease comprising as a base oil a synthetic polyester lubricant or poly-α-olefin lubricant having a kinematic viscosity of 30–50 cSt at 40° C. is filled as a lubricant.

Reflecting the technological developments in recent years, bearings to be employed in electrical components of automobiles such as alternators and electromagnetic clutches are required to meet increasingly stringent usage conditions. In particular, usage conditions for bearings to be used in alternators are becoming far more stringent, including higher temperature and speed because of higher engine performance and heavier load due to an increased belt tension. Bearings of the conventional specification, however, cannot cope with such changes in usage conditions, leading to frequent occurrence of the problem that their life is shortened due to premature flaking of the raceway surfaces of their outer races. There is accordingly an outstanding demand for the effective solution of the problem.

SUMMARY OF THE INVENTION

With the above-described problem of the prior art in view, the present invention has as an object the provision of a rolling bearing which does not develop premature flaking even at high temperature and speed and under heavy load.

The present inventors have proceeded with an extensive investigation on the premature flaking phenomenon of bearings in electrical components for vehicles, especially in alternators, the usage conditions of which bearings are becoming more stringent, as described above, resulting in the finding of some causes for the premature flaking phenomenon. This finding has led to the completion of the present invention.

The present invention therefore provides a rolling bearing composed of an outer race, an inner race and rolling elements interposed between the outer race and the inner race. The rolling bearing is filled with a lubricant composition which comprises a polyether lubricant as a base oil.

Preferably, the outer race and/or inner race of the rolling bearing is made of steel having an oxygen content not higher than 6 ppm and a raceway surface thereof has been hardened to a necessary hardness by heat treatment. The polyether lubricant may preferably have a kinematic viscosity of 90–160 cSt at 40° C. The polyether lubricant can be a polyphenyl ether lubricant, for example, a polyalkyldiphenyl ether lubricant.

The rolling bearing according to the present invention has brought about numerous advantages. In particular, use of a polyether lubricant having a kinematic viscosity of 90–160 cSt at 40° C. as a base oil makes it possible to bring about the advantage that, even under severe conditions of high temperature, high speed and heavy load, an oil film of an appropriate thickness can be retained between rolling elements and races so the premature flaking phenomenon of bearings can be effectively prevented. This advantage can be enhanced where the races of the rolling bearing are made of steel having an oxygen content not higher than 6 ppm and the raceway surfaces thereof are hardened to a necessary hardness by heat treatment.

BRIEF DESCRIPTION OF THE DRAWINGS

The above and other objects, features advantages of the present invention will become apparent from the following description and the appended claims, taken in conjunction with the accompanying drawings in which:

DETAILED DESCRIPTION OF THE INVENTION AND PREFERRED EMBODIMENTS

Among the causes for the premature flaking phenomenon of bearings, there are particularly strong correlations between the kind and viscosity of a base oil for a grease used as a lubricant and the premature flaking phenomenon. Marked flaking is observed with greases whose base oils have a kinematic viscosity lower than 90 cSt at 40° C., because such greases presumably fail to ensure the formation of an oil film of a thickness required under such high temperature and speed and heavy load conditions as described above and hence to provide appropriate damper effects. In contrast, the use of a polyether lubricant, especially one having a kinematic viscosity of at least 90 cSt but not higher than 160 cSt at 40° C., as a base oil has been found to retain an oil film of a thickness efficient even at high temperature and high speed and further to have a pressure viscosity index effective for heavy load, thereby making it possible to extremely effectively inhibit the premature flaking phenomenon of bearings. Incidentally, kinematic viscosities higher than 160 cSt at 40° C. tends to result in excessive agitation resistance by the filled greases upon operation of bearings so that phenomena such as a torque increase and heat generation would become more conspicuous. Such high kinematic viscosities are therefore not preferred.

As another cause, influence by impurities in steel employed as a bearing material is observed. It has also been found that use of a high-purity material with the total content of such impurities reduced to an oxygen content not higher than 6 ppm is effective for the prevention of the premature flaking phenomenon.

Further, application of heat treatment such as carburization, carbonitridation or induction hardening to the raceway surface of an outer race, to which raceway surface off-load is exerted, has been found to permit diffusion of carbon atoms in a top layer of the raceway surface to result in reinforcement by solid solution, an increase in the content of residual austenite and the development of residual compressive strain, effectively contributing to the prevention of the premature flaking phenomenon.

Based on these findings, the present inventors have completed the present invention as mentioned above. The present invention will hereinafter be described in more detail on the basis of the following examples. It should however be borne in mind that the present invention is not limited to or by the following examples.

EXAMPLE 1

Figure 1:
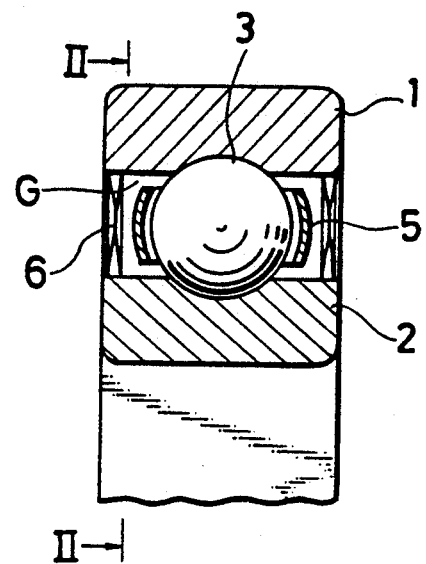
FIG. 1 is a vertical cross-section of a sealed radial ball bearing to be described subsequently in Example 1.
Figure 2:
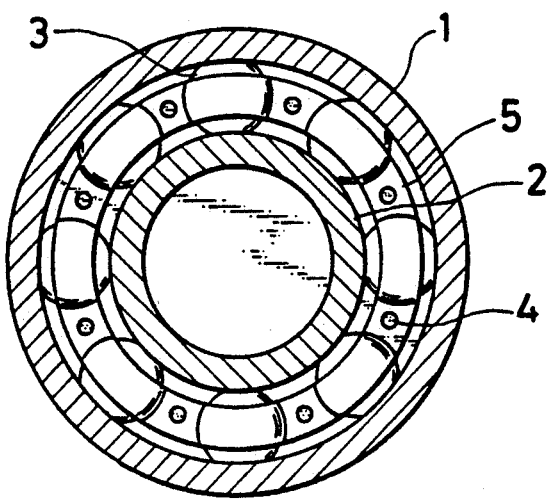
FIG. 2 is a cross-section of the bearing of FIG. 1, taken along line II-II of FIG. 1.

FIG. 1 is a vertical cross-section of a sealed radial ball bearing (JIS bearing No. 6303) according to a first embodiment of this invention, whereas FIG. 2 is a cross-section taken along line II—II of FIG. 1. Interposed between an outer race 1 and an inner race 2 are rolling elements 3. The rolling elements 3 are rotatably held by corrugated retainers 5 integrated together by connecting rivets 4. A lubricant grease G is filled between the inner race 2 and the outer race 1 and is sealed by seal members 6.

Using that bearing as a test sample, differences in anti-flaking life depending primarily on differences in the lubricant composition filled in the bearing were substantiated.

A test was conducted as an actual machine test in which the test sample was mounted on the side of a pulley of an alternator and the presence or absence of flaking on each raceway surface was observed after being operated for a predetermined time. The revolution speed was changed over between 9,000 rpm and 18,000 rpm at every 10th second, so that a rapid acceleration-deceleration endurance test was conducted.

A bearing according to the present invention was filled with a grease as a lubricant composition, which grease contained as a base oil a polyalkyldiphenyl ether lubricant having a kinematic viscosity in the range of from 90 cSt to 160 cSt at 40° C. As a steel, a steel having an oxygen content of 6 ppm, namely, a so-called high-purity carburized steel, was used. The raceway surface of an outer race had been subjected to carburization.

A bearing of Comparative Example 1 was filled with a grease as a lubricant composition, which grease contained as a base oil a polyester lubricant having a kinematic viscosity in a range of 30–50 cSt at 40° C. As a steel, a high-carbon chromium bearing steel having an oxygen content of 9 ppm was used. The raceway surface of an outer race had been subjected to standard heat treatment (whole quench hardening).

A bearing of Comparative Example 2 was filled with a grease as a lubricant composition, which grease contained as a base oil a poly-α-olefin lubricant having a kinematic viscosity in a range of 30–50 cSt at 40° C. As a steel, a steel having an oxygen content of 6 ppm, namely, a so-called high-purity carburized steel was used. The raceway surface of an outer race had been subjected to carburization.

Figure 3:
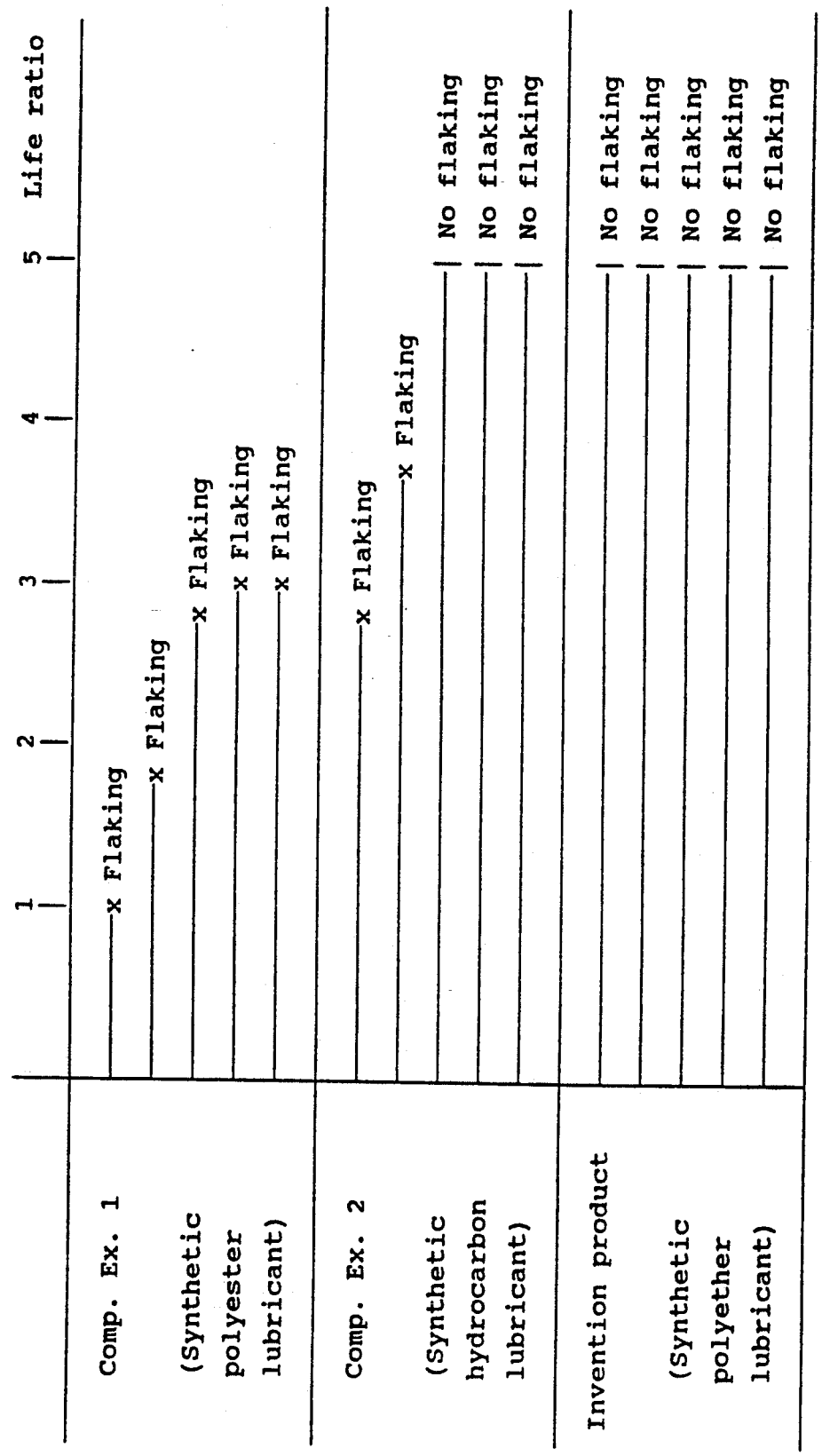
FIG. 3 is a graph showing differences in bearing life due to differences in the lubricant composition filled in each bearing.

The test was conducted on 5 pieces of each of the above test samples. Using as a basis the time in which development of flaking was observed first among the sample pieces of Comparative Example 1, the presence or absence of developed flaking in an operation time 5 times as long as the former time was observed. The results are shown in FIG. 3.

According to the results of the severe alternator actual machine test, development of flaking was observed at an early stage on all the sample pieces of Comparative Example 1 directed to the conventional product. In Comparative Example 2 in which the conventional grease was filled as a lubricant composition, two out of the five sample pieces developed flaking at an early stage although they were the same in steel and heat treatment as the sample pieces of the present invention.

In contrast, the sample pieces of the invention sample were all free from flaking, thereby clearly demonstrating the marked effects for the prolongation of the bearing life by the use of the lubricant according to the present invention.

EXAMPLE 2

Effects for the prolongation of bearing life by the carburization of bearing races were substantiated.

Thrust ball bearings were used as test samples. A life comparison test was conducted on those equipped with races made of conventional high carbon chromium bearing steel (SUJ2) and subjected to whole quench hardening and also on those equipped with races made of chromium steel (SCr420) and subjected to carburization. The results of the life comparison test are shown in a Weibull chart of FIG. 4.

The test samples were mounted on a thrust-type life testing machine and tested under the following conditions.
Maximum Hertzian stress (Pmax): 560 kgf/mm$^2$
Revolution speed (N): 3,000 rpm
Lubricant: #150 turbine oil
Temperature: 125°–130° C.

Figure 4:
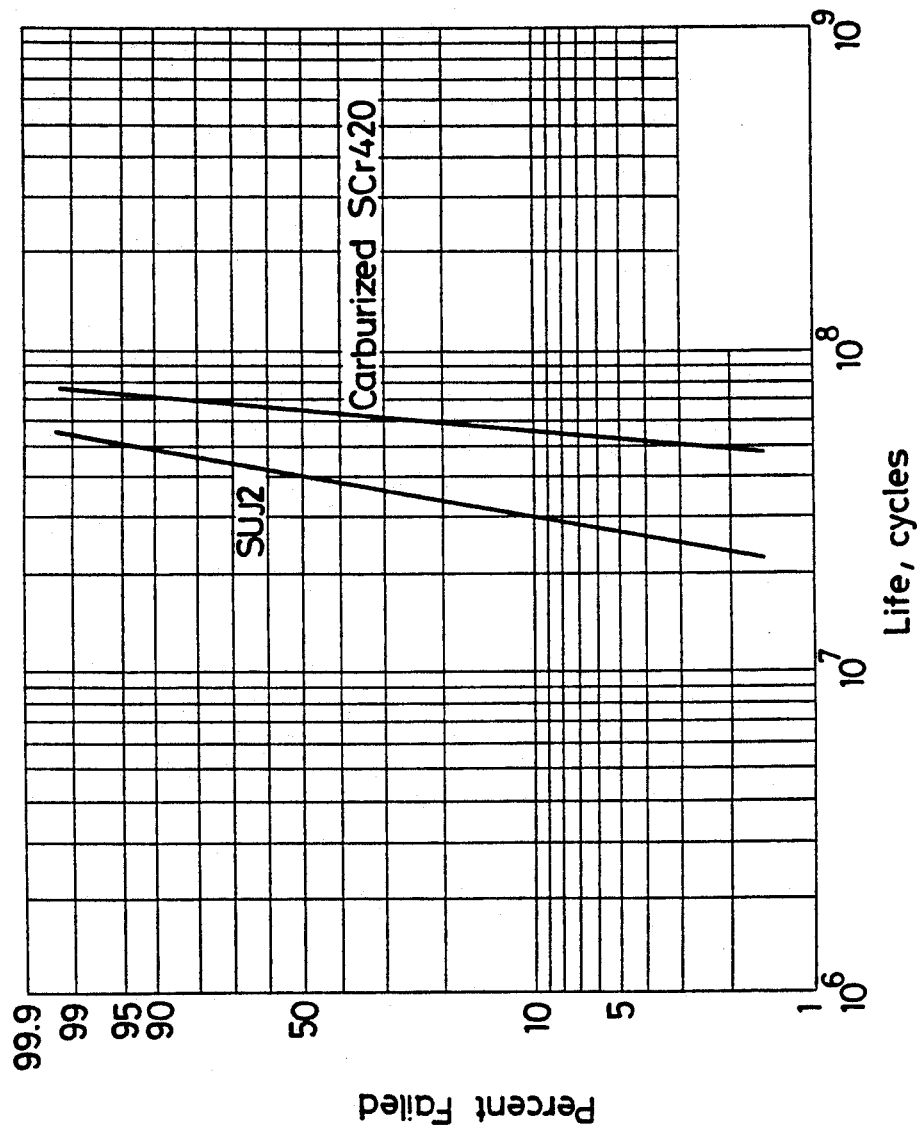
FIG. 4 is a graph illustrating effects for the prolongation of bearing life by the carburization of the races of a bearing.

From FIG. 4, effects for the prolongation of bearing life by carburization are clear.

EXAMPLE 3

Differences in effects for bearing life by differences in the content of oxygen in steels employed for bearings (namely, the levels of impurities in the steels, in other words, the degrees of purity of the steels) were substantiated.

Figure 5:
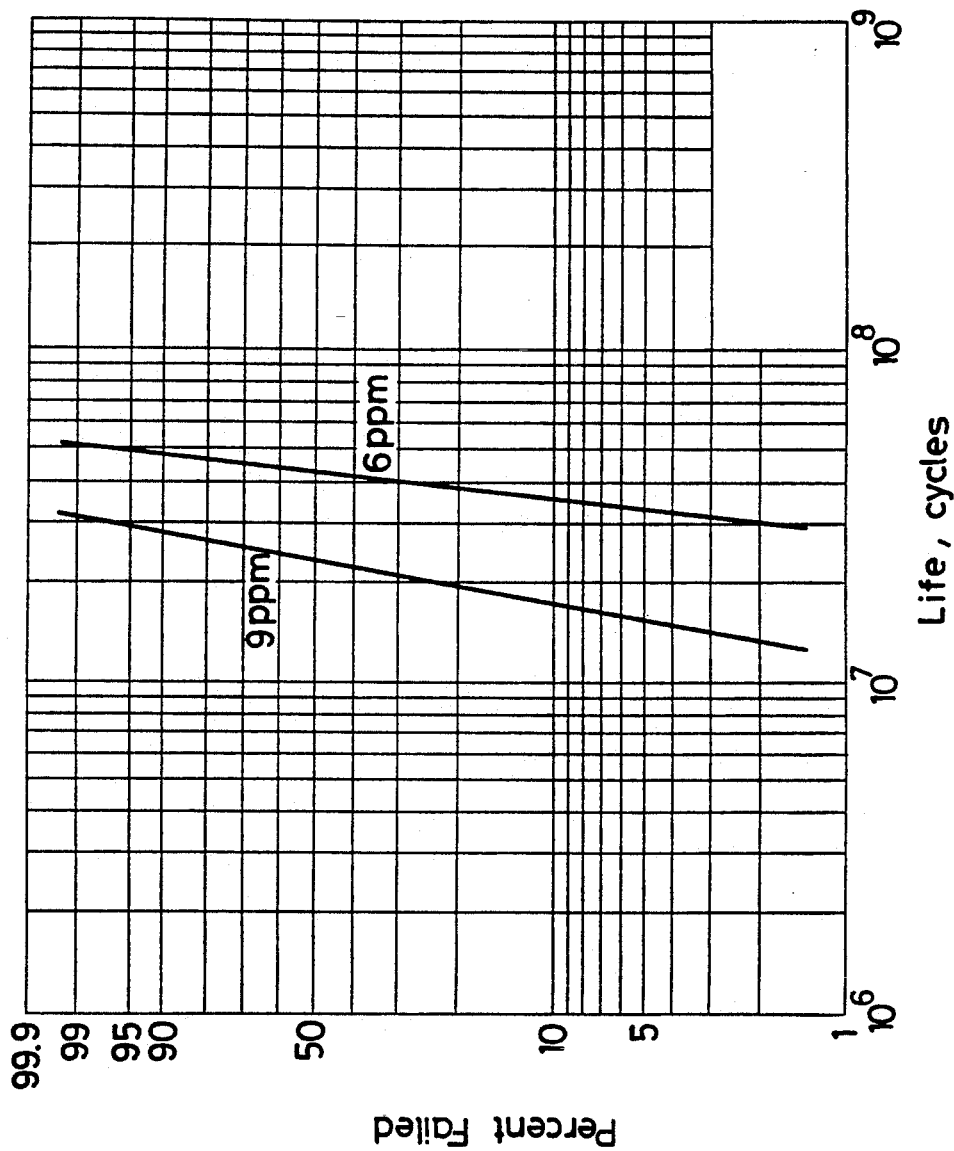
FIG. 5 is a graph depicting effects on bearing life by reduction in the oxygen content of bearing steel.

As test samples, thrust ball bearings were used as in Example 2. Using a thrust-type life testing machine, a test was conducted under the following conditions on test samples made of conventional steel whose oxygen content was 9 ppm and also on test samples made of high-purity steel whose oxygen content was 6 ppm.
Maximum Hertzian stress (Pmax): 500 kgf/mm$^2$
Revolution speed (N): 1,000 rpm
Lubricant: #68 turbine oil The results are shown in a Weibull chart of FIG. 5.

From the figure, the life-prolonging effects of high-purity steel whose oxygen content is 6 ppm are evident.

In the above embodiments, carburization was applied as heat treatment. As well, carbonitridation, induction heating, standard heat treatment and the like can also be used effectively.

It is to be noted that the rolling bearing according to the present invention is not limited to the ball bearings in the above examples but include ball bearings of other types and roller bearings.

Further, the present invention can be equally applied to rolling bearings of the type where no seal members are directly provided on the bearings.

In the rolling bearing according to the present invention, the lubricant composition can be added with known additives as needed. These known additives include thickeners, oxidation inhibitors, rust preventives, extreme pressure additives, oiliness agents, corrosion inhibitors, solid lubricants, etc. For example, sodium nitrite can be added as a rust preventive. As a thickener, a diurea compound can be added, preferably in an amount of 2-35 wt. % based on the polyether lubricant.

We claim:

1. In a rolling bearing composed of an outer race, an inner race and rolling elements interposed between the outer race and the inner race, the improvement wherein a lubricant composition comprising a polyether lubricant as a base oil is filled in the bearing, the polyether lubricant having akinematic viscosity of 90-160 cSt at 40° C., and wherein the outer race and/or inner race of the rolling bearing is made of steel having an oxygen content not higher than 6 ppm and a raceway surface thereof has been hardened to a necessary hardness by heat treatment.

* * * * *